United States Patent
Li

(10) Patent No.: US 11,119,847 B2
(45) Date of Patent: Sep. 14, 2021

(54) SYSTEM AND METHOD FOR IMPROVING EFFICIENCY AND REDUCING SYSTEM RESOURCE CONSUMPTION IN A DATA INTEGRITY CHECK

(71) Applicant: Alibaba Group Holding Limited, Grand Cayman (KY)

(72) Inventor: Shu Li, Bothell, WA (US)

(73) Assignee: Alibaba Group Holding Limited, Grand (KY)

( * ) Notice: Subject to any disclaimer, the term of this patent is extended or adjusted under 35 U.S.C. 154(b) by 0 days.

(21) Appl. No.: 16/682,726

(22) Filed: Nov. 13, 2019

(65) Prior Publication Data

US 2021/0141685 A1 May 13, 2021

(51) Int. Cl.
*G06F 11/10* (2006.01)
*G06F 9/30* (2018.01)
*G06F 11/07* (2006.01)

(52) U.S. Cl.
CPC ...... *G06F 11/1004* (2013.01); *G06F 9/30029* (2013.01); *G06F 11/0793* (2013.01); *G06F 11/1044* (2013.01)

(58) Field of Classification Search
CPC .................................................. G06F 11/1044
USPC .................................. 714/758, 755, 757, 760
See application file for complete search history.

(56) References Cited

U.S. PATENT DOCUMENTS

| | | | |
|---|---|---|---|
| 6,148,377 A | 11/2000 | Carter | |
| 10,235,198 B2 | 3/2019 | Qiu | |
| 2011/0055471 A1 | 3/2011 | Thatcher | |
| 2011/0060722 A1* | 3/2011 | Li | G06F 16/122 707/649 |
| 2011/0099418 A1 | 4/2011 | Chen | |
| 2011/0161784 A1 | 6/2011 | Selinger | |
| 2011/0289280 A1* | 11/2011 | Koseki | G06F 12/0808 711/154 |
| 2013/0080391 A1 | 3/2013 | Raichstein | |
| 2014/0082273 A1 | 3/2014 | Segev | |
| 2015/0301964 A1 | 10/2015 | Brinicombe | |
| 2015/0363271 A1 | 12/2015 | Haustein | |
| 2017/0147499 A1 | 5/2017 | Mohan | |

(Continued)

FOREIGN PATENT DOCUMENTS

WO 9418634 8/1994

*Primary Examiner* — Fritz Alphonse
(74) *Attorney, Agent, or Firm* — Shun Yao; Park, Vaughan, Fleming & Dowler LLP

(57) ABSTRACT

The system receives, by a first controller, data to be written to a first storage device. The data may not be accompanied by a cyclic redundancy check (CRC) signature. The system calculates, by the first controller, a first error detection code based on the data, and writes the data and the first error detection code to the first storage device. The system calculates a second error detection code based on the written data. The system performs a first integrity check of the written data by determining whether the second error detection code matches the first error detection code. The system performs a second integrity check of the written data by: obtaining one or more additional error detection codes from one or more other storage devices, wherein an obtained error detection code is calculated by a controller of a corresponding storage device; and determining whether the first error detection code matches the one or more additional error detection codes.

20 Claims, 14 Drawing Sheets

(56) References Cited

U.S. PATENT DOCUMENTS

2018/0107591 A1     4/2018   Smith
2019/0205206 A1     7/2019   Hornung

* cited by examiner

SYSTEM AND METHOD FOR IMPROVING EFFICIENCY AND REDUCING SYSTEM RESOURCE CONSUMPTION IN A DATA INTEGRITY CHECK

BACKGROUND

Field

This disclosure is generally related to the field of data storage. More specifically, this disclosure is related to a system and method for improving efficiency and reducing system resource consumption in a data integrity check.

Related Art

Today, various storage systems are being used to store and access the ever-increasing amount of digital content. A storage system can include storage servers with one or more storage devices, and a storage device can include storage media with a non-volatile memory (such as a solid state drive (SSD) or a hard disk drive (HDD). Once data has been written to the storage media, the data may sit in the storage media for an unknown period of time. An application which subsequently requests the written data cannot be assured of the integrity (i.e., the accuracy and consistency) of the data. However, the timing of a request to read the written data is not predictable and may occur after a significant amount of time. During this time, the data may be silently compromised. That is, at a much later time after initial storage of the data, the system may determine that the data has lost its correct value. At this later time, it may be challenging to recover the correct value of the data.

To address this challenge, a storage system generally performs frequent data integrity checks as background operations to ensure both data integrity and data retention. Current techniques for performing a data integrity check are directed to recovering data on a single drive, but a storage system may still experience data loss if the data integrity check is not performed frequently enough. Thus, performing the data integrity check is an important operation. Improving this data integrity check operation can result in an improved efficiency for the overall storage system, including a significant reduction in the consumption of system resources.

SUMMARY

One embodiment provides a system and method for facilitating a data integrity check. During operation, the system receives, by a first controller, data to be written to a first storage device. The data may not be accompanied by a cyclic redundancy check (CRC) signature or other error detection code. The system calculates by the first controller, a first error detection code based on the data. The system writes the data and the first error detection code to the first storage device. The system calculates a second error detection code based on the written data. The system performs a first integrity check of the written data by determining whether the second error detection code matches the first error detection code.

In some embodiments, the system performs the first integrity check of the written data by performing the following operations. In response to determining that the second error detection code matches the first error detection code: the system successfully verifies the integrity of the written data; and the system transmits the first error detection code to a computing device from which the data to be written is received. In response to determining that the second error detection code does not match the first error detection code, the system performs a remedial action associated with unhealthy data stored in the first storage device.

In some embodiments, the system performs a second integrity check of the written data by: obtaining one or more additional error detection codes from one or more other storage devices, wherein a respective obtained error detection code is calculated by a controller of a corresponding storage device based on a replica of the written data; and determining whether the first error detection code matches the one or more additional error detection codes.

In some embodiments, the system performs the second integrity check of the written data by performing the following operations. The system performs an exclusive OR operation on the first error detection code and the one or more additional error detection codes. In response to determining that the exclusive OR operation yields a true result, the system successfully verifies the integrity of the written data. In response to determining that the exclusive OR operation yields a false result, the system performs a remedial action associated with unhealthy data stored in the first storage device or the other storage devices.

In some embodiments, the system receives, by the first controller from a computing device, a request to read the data. The system retrieves the written data and the first error detection code from the first storage device. The system transmits the retrieved data and the retrieved first error detection code to the computing device, which causes the computing device to: receive the transmitted data and the transmitted first error detection code; calculate a third error detection code based on the received data; perform a third integrity check of the received data by determining whether the calculated third error detection code matches the received first error detection code; and in response to determining that the calculated third error detection code matches the received first error detection code, successfully verify the integrity of the received data.

In some embodiments, prior to writing the data and the first error detection code to the first storage device, the system encodes, based on an error correction code (ECC), the data and the first error detection code to obtain an ECC codeword which includes the data, the first error detection code, and an ECC parity, wherein writing the data and the first error detection code to the first storage device comprises writing the ECC codeword to the first storage device.

In some embodiments, the system receives, by the first controller, a request to read the data. The system retrieves the written ECC codeword from the first storage device. The system decodes, based on the error correction code (ECC), the retrieved ECC codeword to obtain a real-time ECC parity. The system performs a fourth integrity check of the data from the retrieved ECC codeword by comparing the real-time ECC parity with the retrieved ECC parity from the retrieved ECC codeword.

In some embodiments, the system receives second data to be written to a set of storage devices. The system encodes, based on an erasure code (EC), the second data to obtain an EC codeword which includes an EC parity. The system splits the EC codeword into a plurality of parts. The system writes the plurality of parts to the set of storage devices, wherein a controller of a respective storage device of the set of storage devices calculates a respective error detection code based on a respective part, and wherein the controller of the respective storage device writes the respective part and the respective calculated error detection code to the respective storage device.

In some embodiments, the system detects a condition to check an integrity of the EC codeword written as the plurality of parts to the set of storage devices. The system retrieves the respective error detection codes written to the set of storage devices. The system obtains parity check EC data by: padding the retrieved respective error detection codes with zeros; shifting the respective error detection codes to align with the EC codeword; and concatenating the shifted respective error detection codes to form the parity check EC data. The system decodes, based on the erasure code (EC), the obtained parity check EC data to determine whether the second data of the EC codeword is healthy.

BRIEF DESCRIPTION OF THE FIGURES

In the figures, like reference numerals refer to the same figure elements.

DETAILED DESCRIPTION

Figure 1:
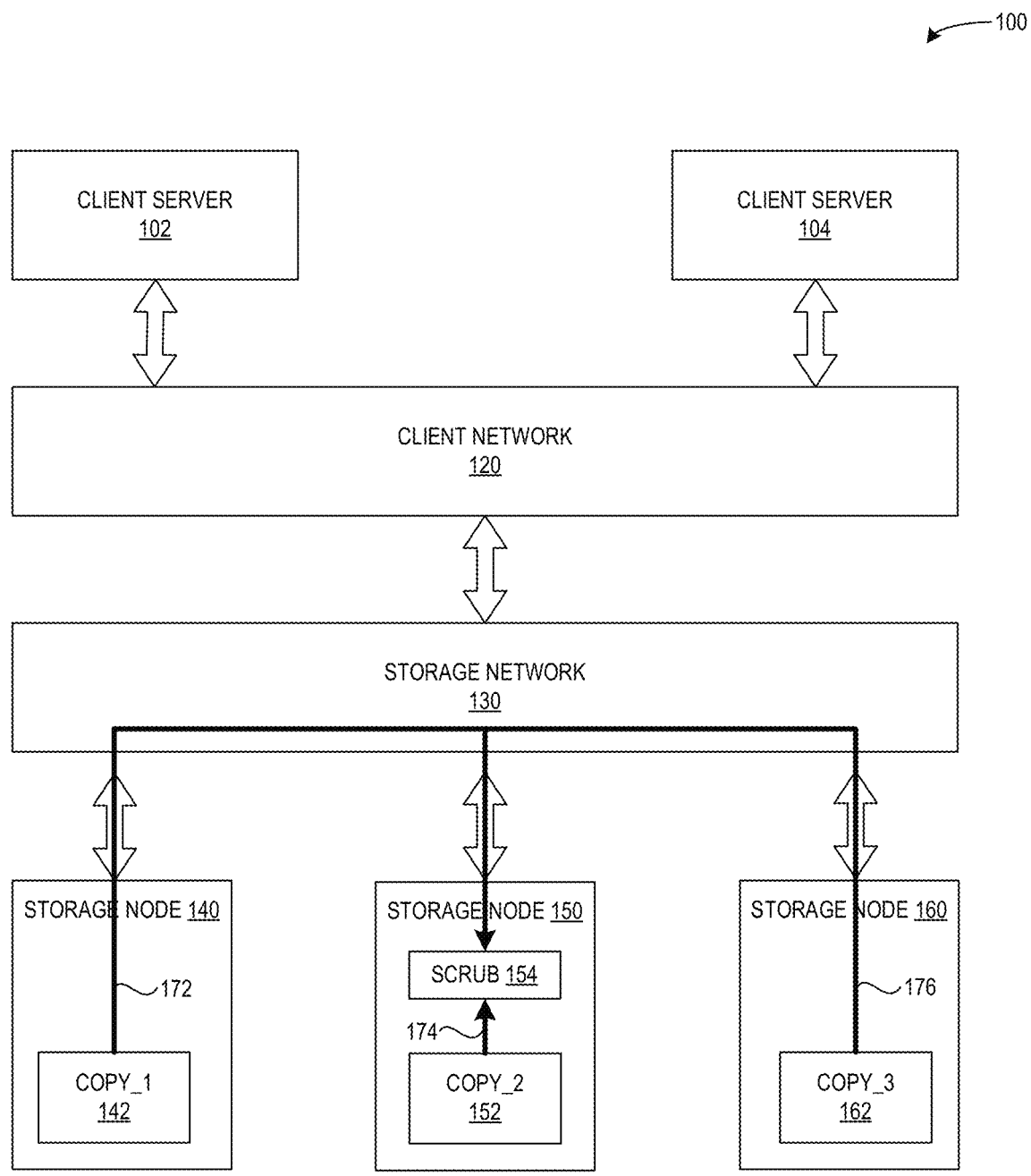
FIG. 1 illustrates an exemplary environment which facilitates a data integrity check, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein facilitate an improved efficiency and reduced system resource consumption in a data integrity check by providing a storage device with internal hardware which generates a CRC signature and performs the data integrity check using the storage device-generated CRC signature. In addition, the described embodiments can perform a cluster-level data integrity check based on a re-decoded EC codeword formed by CRC signatures from multiple storage devices, which allows the system to consolidate the integrity of the global data stored at the cluster-level.

As described above, once data has been written to the storage media, the data may sit in the storage media for an unknown period of time. An application which subsequently requests the written data cannot be assured of the integrity (i.e., the accuracy and consistency) of the data. However, the timing of a request to read the written data is not predictable and may occur after a significant amount of time. During this time, the data may be silently compromised. That is, at a much later time after initial storage of the data, the system may determine that the data has lost its correct value. At this later time, it may be challenging to recover the correct value of the data.

To address this challenge, a storage system generally performs frequent data integrity checks as background operations to ensure both data integrity and data retention. Current techniques for performing a data integrity check are directed to recovering data on a single drive, but a storage system may still experience data loss if the data integrity check is not performed frequently enough. Furthermore, current techniques may result in several limitations, as described below in relation to FIG. 1. Thus, performing the data integrity check is an essential operation. Improving this essential operation can result in an improved efficiency for the overall storage system, including a significant reduction in the consumption of system resources.

The embodiments described herein address these challenges by providing a system in which, rather than the host CPU generating the CRC signature, the storage device (via a controller) receives only the data to be written and subsequently generates the CRC signature ("CRC_drive") for the data. The storage device can perform an ECC encoding on the data and the generated CRC signature. The storage device can write the data, the CRC signature, and corresponding ECC parity bits to the storage device. This allows the host CPU (or requesting application) to refrain from generating a CRC signature ("CRC_host") for the data, and to further refrain from sending both the data and the CRC signature (i.e., the CRC_host) to the storage device to be written to the storage device. This reduction in the consumption of system resources can result in an improved efficiency for the storage system. A comparison of an environment for performing a data integrity check in the prior art versus in an embodiment of the present application is described below in relation to, respectively, FIGS. 3A and 3B.

Figure 5:
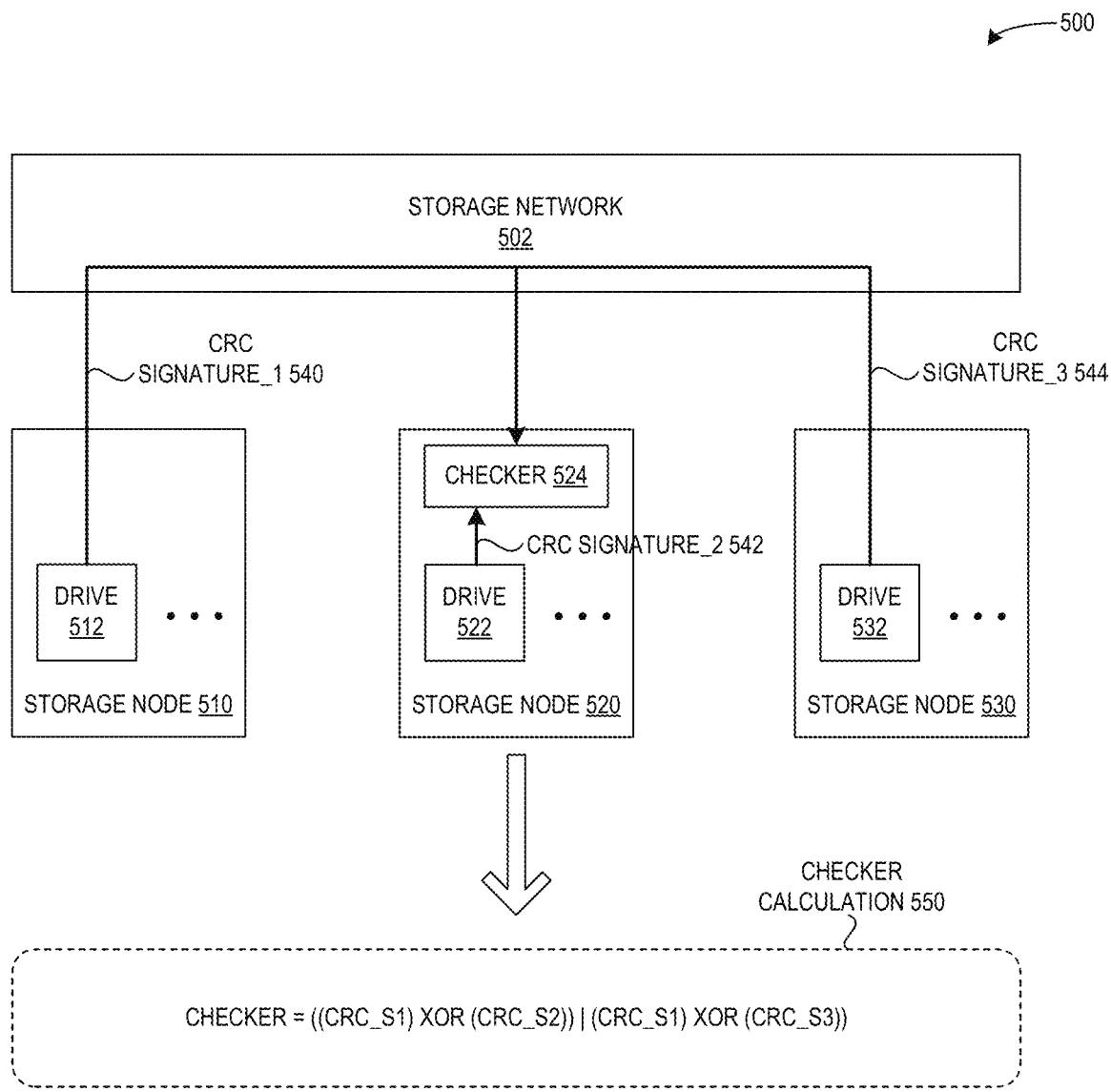
FIG. 5 illustrates an environment which facilitates a data integrity check in a multi-replica distributed storage system, in accordance with an embodiment of the present application.

Moreover, in a multiple replica distributed storage system, where replicas are stored at one or more storage devices, the embodiments described herein can use only the storage device-generated CRC signatures ("CRC_drive") to perform a data integrity check, as described below in relation to FIG. 5. Additionally, in an EC-based distributed storage system, the embodiments described herein can split and interleave an EC codeword by storing the EC codeword as a plurality of parts across a set of storage devices. The system can also perform zero-padding, shifting, alignment, and concatenation to obtain EC parity check data, and use that obtained EC parity check data to perform a data integrity check, as described below in relation to FIG. 6.

Thus, by offloading the CRC signature generation to the storage device, the embodiments described herein can bypass the CPU generation of the CRC signature. The system can also perform a more efficient data integrity check in a multiple replica distributed system by only comparing the CRC signatures from various storage devices. The system can further perform a more efficient data integrity check in an EC-based distributed system by splitting and interleaving the EC codeword across a set of storage devices. By using a more efficient data integrity check, the system can also reduce the amount of system resources consumed in performing this essential and frequent data integrity check.

A "distributed storage system" can include multiple storage servers. A "storage server" or a "storage system" refers to a computing device which can include multiple storage devices or storage drives. A "storage device" or a "storage drive" refers to a device or a drive with a non-volatile memory which can provide persistent storage of data, e.g., a solid state drive (SSD) or a hard disk drive (HDD).

A "multiple replica distributed storage system" refers to a distributed storage system in which replicas of data are stored across multiple storage devices or servers of the distributed storage system.

An "EC-based distributed storage system" refers to a distributed storage system in which data is first encoded based on an erasure code (EC) before the data is written to multiple storage drives of the distributed storage system. In some embodiments, the EC-encoded data is split into a plurality of parts and interleaved and written to the multiple storage drives.

The terms "error detection code" and "error-detecting code" are used interchangeably, and refer generally to a sequence of numbers generated by specific procedures for detecting errors in data that has been transmitted over computer networks. A "cyclic redundancy check" or "CRC" signature refers to a type of checksum which is an error-detecting code or error detection code commonly used to detect accidental changes to raw data. In this disclosure, a CRC signature is used to describe the embodiments of the system, but the described embodiments may use any error detection code or error-detecting code. In some embodiments, the system can use an error correction code.

A "data integrity check" refers to an operation in which the accuracy and consistency of given data is validated, checked, or verified. In some embodiments, the data integrity check is performed based on a CRC signature associated with or for the given data.

Exemplary Data Integrity Check in the Prior Art

FIG. 1 illustrates an exemplary environment 100 which facilitates a data integrity check, in accordance with the prior art. Environment 100 depicts a current technique in which the system performs a data integrity check based on a configurable time interval or period of time. The current technique can involve two steps. First, given data stored as replicas on multiple storage drives, the system can read the metadata of a large data chunk (e.g., an object on the order of multiple Megabytes (MB)) to ensure that the size and attributes of the multiple replicas of data are consistent. Second, the system can compare the checksum of each replica of the large data chunk, which requires reading out every bit of the large data chunk and calculating a checksum for the large read data chunk.

Environment 100 can include: a client server 102; a client server 104; a client network 120; a storage network 130; a storage node 140; a storage node 150; and a storage node 160. Each of storage nodes 140-160 can store a replica or copy of the same data. For example: storage node 140 can store a copy_1 142; storage node 150 can store a copy_2 152; and storage node 160 can store a copy_3 162.

During operation, the system depicted in environment 100 can perform a data integrity check as a background operation which occurs within the storage cluster (which can include, e.g., storage network 130 and storage nodes 140-160). That is, the data integrity check may be performed not in response to a request from a host, an application, or client servers 102 or 104.

Each storage node can retrieve or read its copy from the storage media to the storage node's system memory, and a local CPU can calculate the checksum of each large data chunk individually. Each storage node can then transmit, to a data scrubbing module residing in one of the storage nodes, the data chunk and the checksum together in order to compare the checksums and data for consistency. The data-scrubbing module can perform a data integrity check procedure. For example, storage node 140 can retrieve copy_1 142 from its storage media to the system memory of storage node 140, and a local CPU of storage node 140 can calculate the checksum for copy_1 142. Storage node 140 can then transmit both copy_1 142 and the calculated checksum to a scrub 154 module of storage node 150 (via a communication 172).

Similarly, storage node 150 and storage node 160 can retrieve or read their respective copy from their respective storage media to the respective storage node's system memory, and a respective local CPU can calculate the checksum for each of copy_2 152 and copy_3 162. Storage node 150 and storage node 160 can then transmit both their respective copies (copy_2 152 and copy_3 162) and the respective calculated checksums to scrub 154 module of storage node 150 (via, respectively, communications 174 and 176). Scrub module 154 can subsequently check that the metadata and data of each retrieved replica are consistent with each other (e.g., in size and other attributes). Scrub module 154 can also calculate a checksum for each retrieved replica, and compare these calculated checksums with the respective received checksums to verify the integrity of the data.

However, the current technique of the system depicted in environment 100 presents several limitations. First, the granularity of data may be large, because an object or chunk may require multiple MBs of storage space. Calculating the checksum for each of the replicas of such a large object or chunk may require a non-trivial time which can decrease the performance and efficiency of the overall storage system.

Second, the CPU cores may consume a significant amount of resources. Data must be retrieved and moved from the storage media to the system memory of the local storage node or server (e.g., in communications 172, 174, and 176). Thus, the system may consume a large amount of system resources both when the CPU cores calculate the checksums for each retrieved replica and in executing the read operation to retrieve the replicas from the storage media. This can increase the burden of the storage server, which can also decrease the efficiency and performance of both the storage server and the overall storage system.

Third, the system may result in an increased write amplification. The host CPU can compute the CRC signature for each sector, where each sector is, e.g., of a 4 KB size. The host can transmit the sector and append the computed CRC signature (e.g., as "data payload+CRC signature") to the storage drive as host data which is to be written to the storage drive. However, because the transmitted data is of an irregular sector size (e.g., not a multiple of 4 KB), the system must divide the data into two consecutive sectors, which can be inefficient due to the resulting holes or gaps in the physical memory. This read-modify-write can thus increase the write amplification, which can also decrease the efficiency and performance of both the storage server and the overall storage system.

These limitations are depicted below in relation to FIG. 2A.

Exemplary Communications in a Data Integrity Check: Prior Art Vs. One Embodiment FIG. 2A illustrates an exemplary environment 200 which facilitates a data integrity check, including the CPU calculating and transmitting the CRC signature, in accordance with the prior art. Environment can depict a storage server, with DIMMs 210 and 230, a CPU 220, and an associated SSD 240. SSD 240 can include a controller 242 and physical storage media as NANDs 244, 246, and 248. During operation, the system can place a 4 KB 232 sector of data in DIMMs 230. CPU 220 can obtain the 4 KB 232 sector and calculate a CRC signature for the 4 KB 232 sector (via a communication 250). CPU 220 can send the CRC signature back to DIMMs 230 for storage (via a communication 252) by appending the CRC signature to the 4 KB 232 sector, e.g., as a 4 KB+CRC 234 sector. The stored 234 sector may then be transmitted to SSD 240 (via a communication 254), where the 4 KB+CRC 234 sector is written to one of NANDs 244-248.

Subsequently, when the system receives a request to read the stored sector 234, both the 4 KB and the CRC of the 234 sector must be read from NANDs 244-248, and sent to CPU 220, which then performs a data integrity check. This process is described below in relation to FIG. 3A.

Figure 2A:
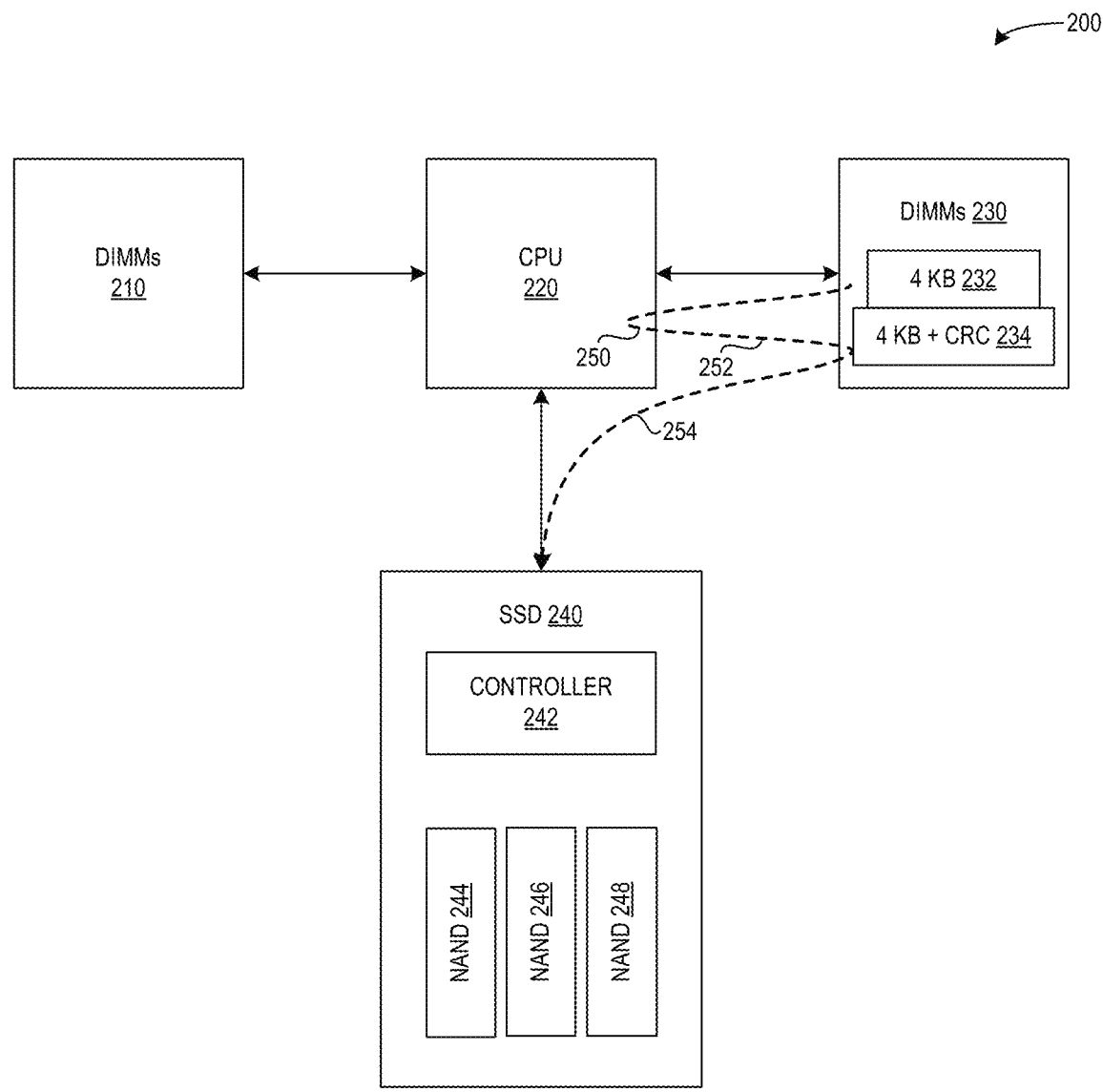
FIG. 2A illustrates an exemplary environment which facilitates a data integrity check, including the CPU calculating and transmitting the CRC signature, in accordance with the prior art.
Figure 2B:
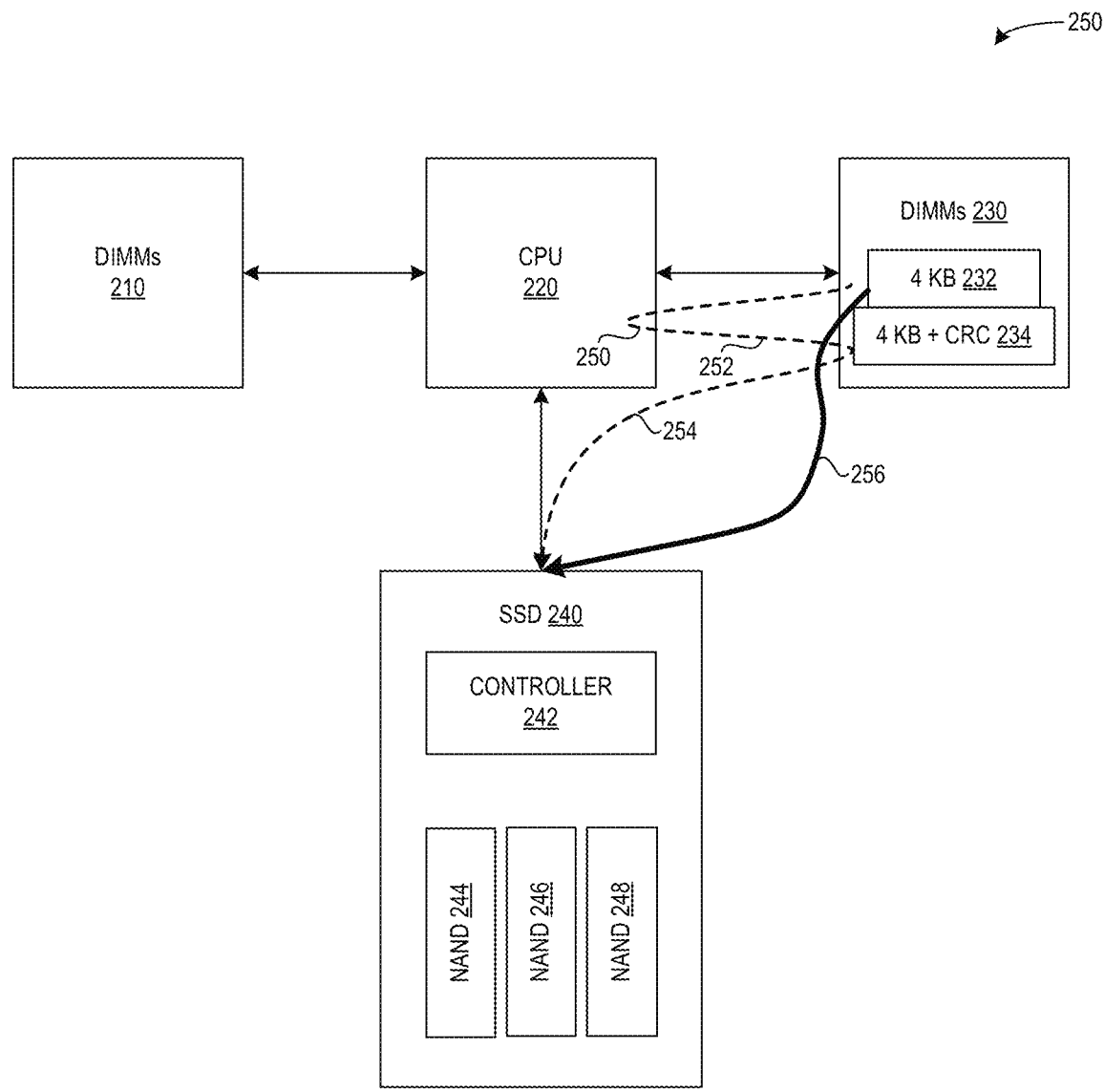
FIG. 2B illustrates an exemplary environment which facilitates a data integrity check, in accordance with an embodiment of the present application.

The embodiments described herein address the challenges described above in relation to the prior art systems of FIGS. 1 and 2A. FIG. 2B illustrates an exemplary environment 250 which facilitates a data integrity check, in accordance with an embodiment of the present application. In environment 250, the system writes only the 4 KB 232 sector to SSD 240, and, using an end-to-end Peripheral Component Interconnect Express (PCIe) protocol for secure transmission, controller 242 calculates the CRC signature for the received 4 KB 232 sector. SSD 240 then saves both the 4 KB 232 sector and the controller-calculated CRC signature in the SSD 240 (e.g., in NANDs 244-248).

In contrast with environment 200 of FIG. 2A, in environment 250, the data is sent directly to the storage device (i.e., SSD 240), which allows the CPU to refrain from calculating the CRC signature and performing a data integrity check. Specifically, controller 242 can receive data (as 4 KB 232), where the data is not accompanied by a CRC signature previously calculated by CPU 220. By eliminating communications/operations 250, 252, and 254, the system can provide a reduced consumption of resources and an increased efficiency and performance of the storage system.

Figure 3A:
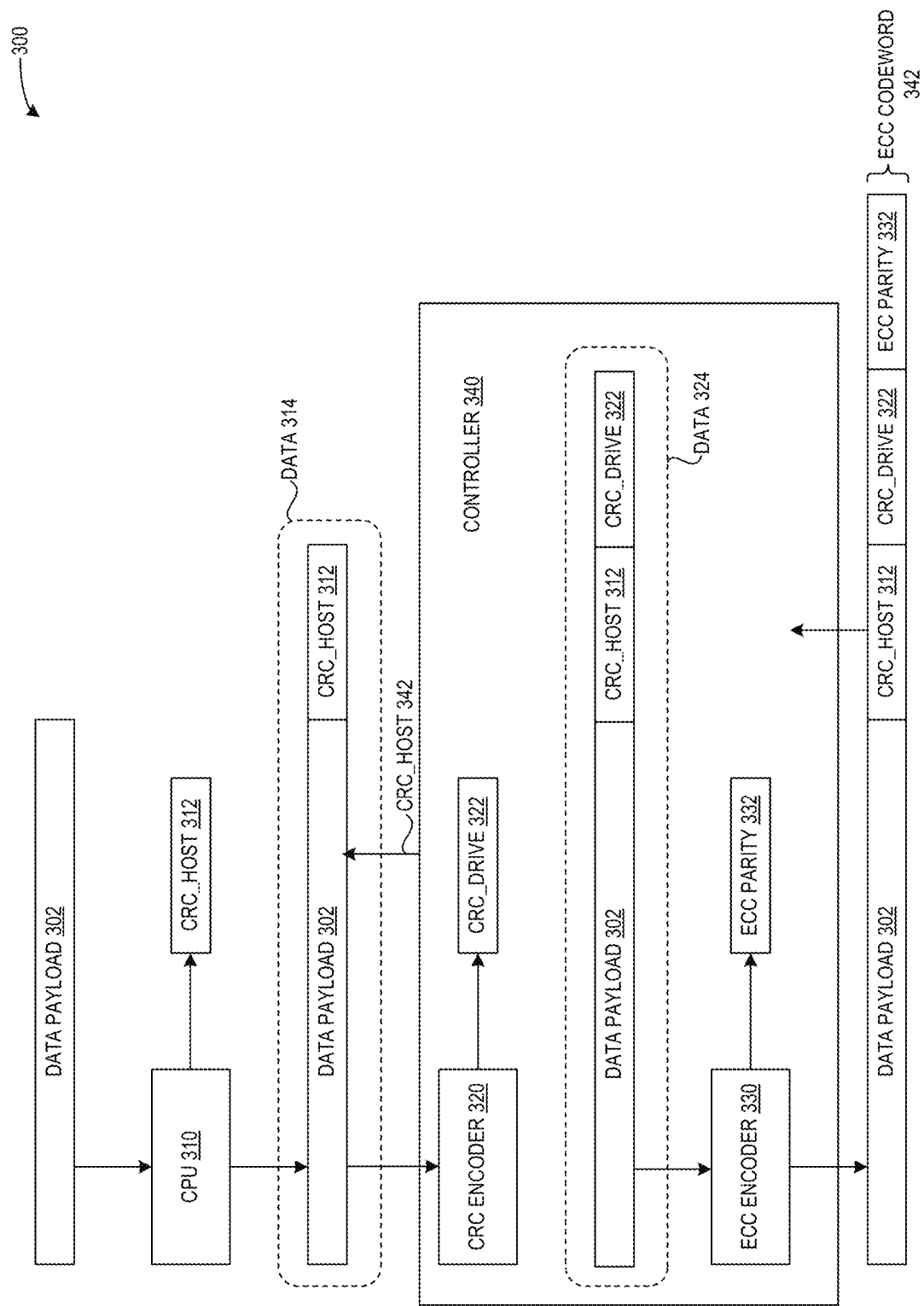
FIG. 3A illustrates an exemplary environment with communications and operations which facilitate a data integrity check, including the CPU calculating and transmitting the CRC signature, in accordance with the prior art.

Exemplary Environment for Facilitating Data Integrity Check in the Prior Art: CPU Calculates and Transmits CRC Signature FIG. 3A illustrates an exemplary environment 300 with communications and operations which facilitate a data integrity check, including the CPU calculating and transmitting the CRC signature, in accordance with the prior art. During operation, a data payload 302 may be sent to and received by a CPU 310. CPU 310 can calculate a CRC_host 312, and transmit data 314 (which can include both data payload 302 and CRC_host 312) to a controller 340. Specifically, a CRC encoder 320 module can receive data 314, and calculate a CRC_drive 322 for data payload 302 of data 314. Controller 340 can transmit data 324 (which can include data payload 302, CRC_host 312, and CRC_drive 322) to an ECC encoder 330 module. ECC encoder 330 module can receive and encode data 324, which generates an ECC parity 332. An ECC codeword 342 can thus include data payload 302, CRC_host 312, CRC_drive 322, and ECC parity 332. Driver controller 340 can subsequently write ECC codeword 342 to the storage media, e.g., to a non-volatile memory such as NAND flash.

Subsequently, in order to read the stored data from the storage media, the system can retrieve ECC codeword 342, decode ECC codeword 342, and return CRC_host 312 back to CPU 310 (e.g., as CRC_host 342 or as part of data 314).

Figure 3B:
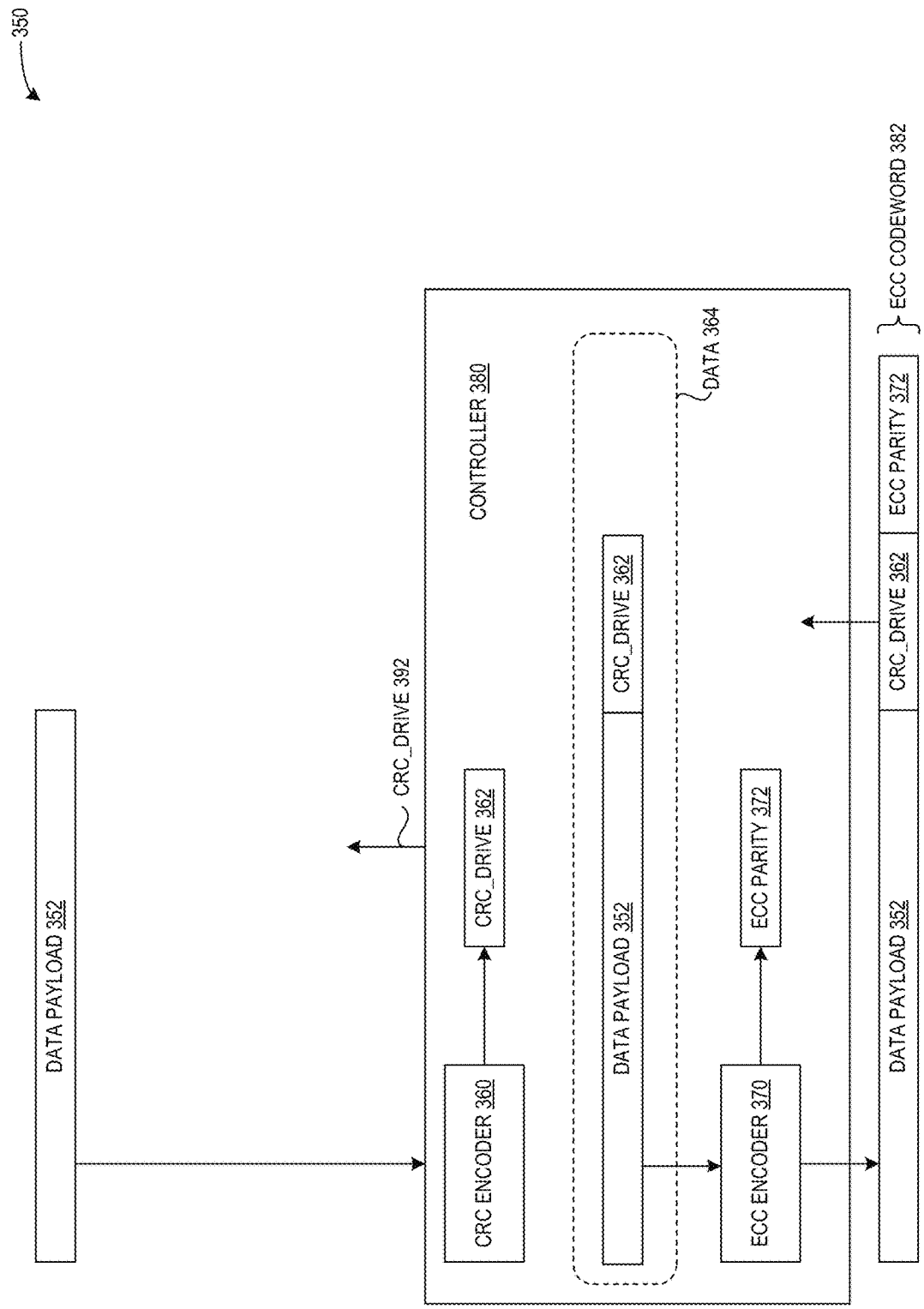
FIG. 3B illustrates an exemplary environment with communications and operations which facilitate a data integrity check, in accordance with an embodiment of the present application.

Exemplary Environment for Facilitating Data Integrity Check: CPU does not Calculate or Transmit CRC Signature FIG. 3B illustrates an exemplary environment 350 with communications and operations which facilitate a data integrity check, in accordance with an embodiment of the present application. Environment 350 depicts how the system can offload and bypass the CPU for the CRC calculation. During operation, a data payload 352 may be sent directly to and received by a controller 380. Specifically, a CRC encoder 360 module can receive data payload 352, and calculate a CRC_drive 362 for data payload 352. Controller 340 can transmit data 364 (which can include data payload 352 and CRC_drive 362) to an ECC encoder 370 module. ECC encoder 370 module can receive and encode data 364, which generates an ECC parity 372. An ECC codeword 382 can thus include data payload 352, CRC_drive 362, and ECC parity 372. Controller 380 can subsequently write ECC codeword 382 to the storage media, e.g., to a non-volatile memory such as NAND flash.

Subsequently, the system can receive a request to read the stored data. In order to read the stored data from the storage media, the system can retrieve and decode ECC codeword 382 to obtain data 364. The system can calculate a real-time CRC signature (not shown) based on data payload 352 (from decoded and obtained data 364). The system can perform a first integrity check of the obtained data (e.g., at the level of a single storage drive) by determining whether the calculated real-time CRC signature matches the stored CRC signature (i.e., CRC_drive 362 from decoded and obtained data 364)). If they match, the system can successfully verify the integrity of the data. If they do not match, the system can perform a remedial action associated with unhealthy data stored in the storage drive. Even if the system successfully verifies the integrity of the data after the first integrity check, the system can also perform a second integrity check, as described below in relation to FIG. 5.

If the read operation is only for purposes of a data integrity check, the system can send CRC_drive 362 back to the host (e.g., as CRC_drive 392). If the read operation is a normal read operation (i.e., for data retrieval), the system can send both data payload 352 and CRC_drive 362 to the host, which allows the host to calculate its own real-time CRC signature for data payload 352, and perform its own integrity check by determining whether its calculated real-time CRC signature matches the received CRC signature (i.e., CRC_drive 362 from decoded and obtained data 364, which was sent as CRC_drive 392).

Note that a hardware circuit in controller 380 can calculate or compute the CRC signature (e.g., as illustrated in FIG. 3B by CRC encoder 360 module which calculates CRC_drive 362). The controller can thus accomplish the CRC generation with a low latency and a low consumption of power, which can result in an improved efficiency and reduced system resource consumption in a data integrity check.

False Validation in a Single Storage Device

Figure 4A:
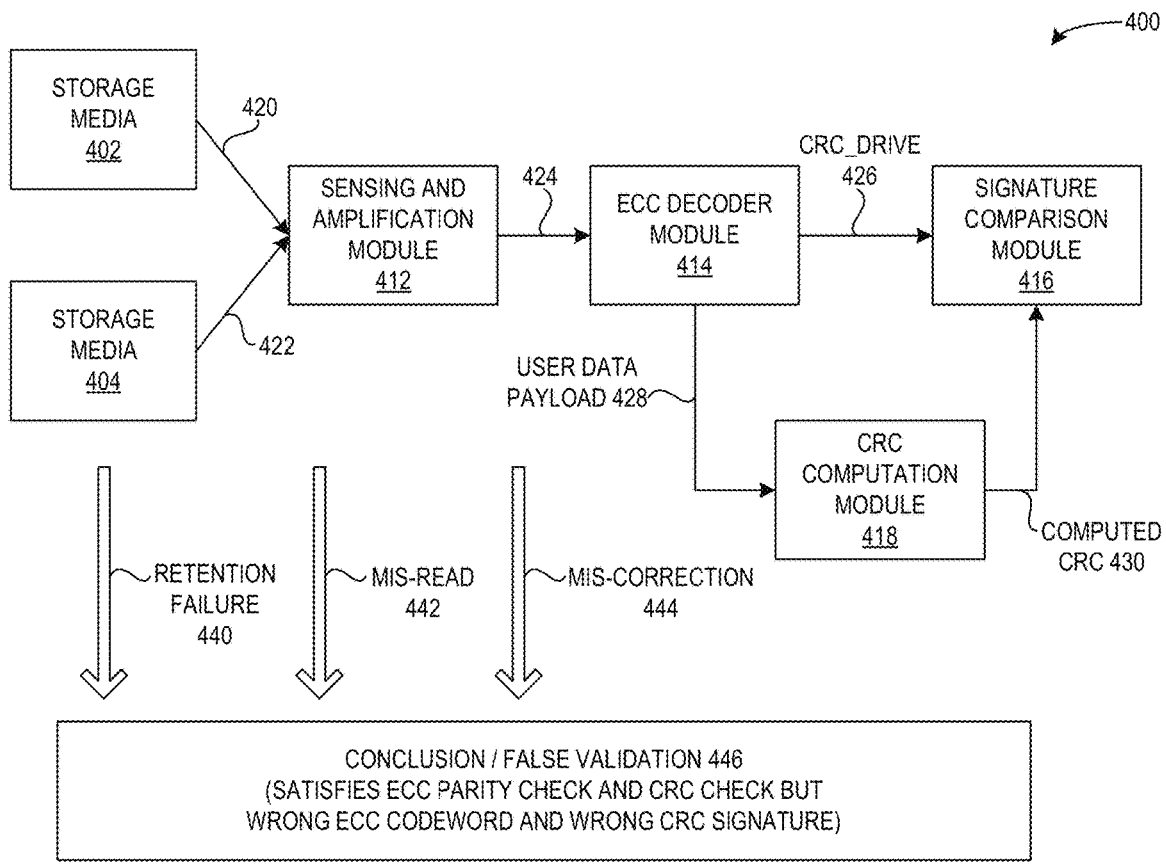
FIG. 4A illustrates an exemplary environment of a data integrity check which results in a false validation, in accordance with an embodiment of the present application.

FIG. 4A illustrates an exemplary environment 400 of a data integrity check which results in a false validation, in accordance with an embodiment of the present application. During operation, data can be read or retrieved from a storage media 402 or a storage media 404, and sent via, respectively, communications 420 and 422, to a sensing and amplification module 412, which can perform sensing and amplification operations related to the retrieved data (e.g., an ECC codeword which, when decoded, can include a user data payload and a CRC_drive). Sensing and amplification module 412 can transmit the retrieved data (e.g., the ECC codeword) to an ECC decoder module 414, via a communication 424. ECC decoder module can decode the ECC codeword to obtain the user data payload and the CRC-_drive. ECC decoder module 414 can send user data payload 428 to a CRC computation module 418, which generates or computes a real-time CRC (computed CRC 430). CRC computation module 418 can send computer CRC 430 to a signature comparison module 416. ECC decoder module 414 can also send CRC_drive 426 to signature comparison module 416.

Signature comparison module 416 can receive CRC-_drive 426 from ECC decoder module 414, and can receive computed CRC 430 from CRC computation module 418. During these communications (420, 422, 424, 426, and 428), various errors may occur, such as a retention failure 440, a mis-read 442 of data, and a mis-correction 444 of data. As such, the result of signature comparison module 416 can be a conclusion or a false validation 446, e.g., where the data satisfies the ECC parity check and the CRC check but is in fact the wrong ECC codeword and/or the wrong CRC signature.

Figure 4B:
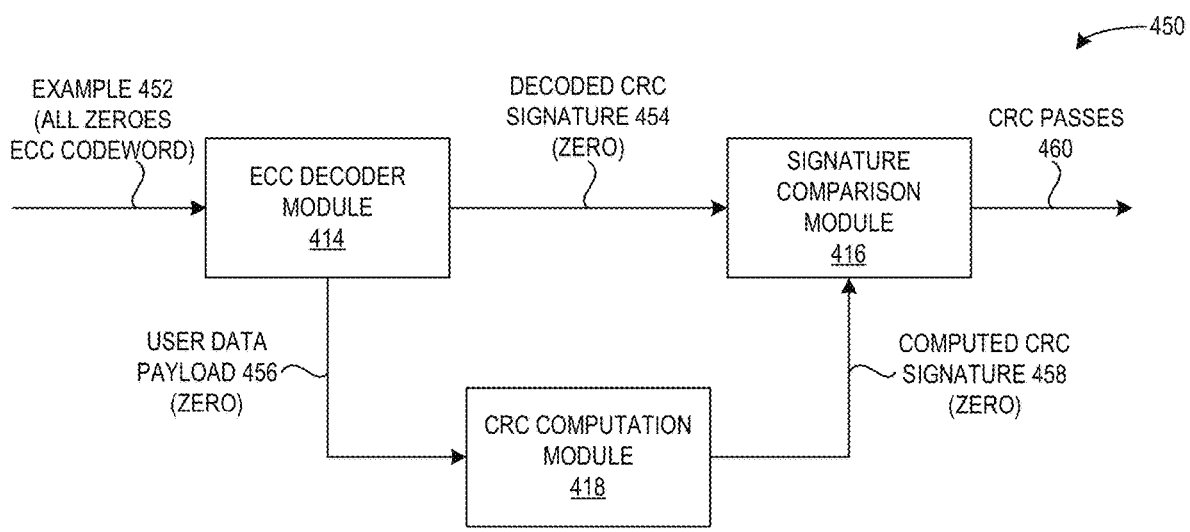
FIG. 4B illustrates an exemplary data integrity check which results in a false validation, corresponding to the environment of FIG. 4A, in accordance with an embodiment of the present application.

FIG. 4B illustrates an exemplary data integrity check 450 which results in a false validation, which corresponds to the environment of FIG. 4A, in accordance with an embodiment of the present application. During operation, ECC decoder module 414 can receive an example 452 data (which can include an ECC codeword comprised of all zeroes). ECC decoder module 414 can decode and obtain a user data payload and a CRC signature, both of which are also comprised of all zeroes or have a value of zero. ECC decoder module 414 can send user data payload 456 (zero) to CRC computation module 418, which can receive the data and compute a CRC signature based on the received data. The computed CRC signature can be all zeroes because the user data payload 456 has experienced a data retention failure and is all zeroes. CRC computation module 418 can send a computed CRC signature 458 (zero) to signature comparison module 416.

Signature comparison module 416 can receive decoded CRC signature 454 (zero) and computed CRC 458 (zero) from CRC computation module 418. Signature comparison module 416 can determine that decoded CRC signature 454 and computed CRC signature 458 match (because both have a value of zero), and conclude that the CRC check passes with a CRC passes 460 result, which is a false validation. Thus, even though the data itself has experienced an error (silent loss), the CRC check performed by the single check validates the data and is unable to properly detect the data loss.

Data Integrity Check in a Multi-Replica Distributed System

The embodiments described herein address the problem associated with a single drive CRC check which results in a false validation. FIG. 5 illustrates an environment 500 which facilitates a data integrity check in a multi-replica distributed storage system, in accordance with an embodiment of the present application. In environment 500, three replicas of data are stored in each of storage nodes 510, 520, and 530, in the manner depicted above in relation to FIGS. 2B and 3B. That is, the replica is written directly to a storage drive of a respective storage node, and a controller of the storage drive or node computes the corresponding CRC signature for the replica. The storage drive then writes the replica and the computed CRC signature to the storage drive. For example: drive 512 of storage node 510 can store a first replica and a corresponding CRC signature_1 540; drive 522 can store a second replica and a corresponding CRC signature_2 542; and drive 532 can store a third replica and a corresponding CRC signature_3 544.

The system depicted in environment 500 can perform a data integrity check. Unlike in the system depicted in environment 100 of FIG. 1, where the replica itself must be read out, in environment 500, each storage node only needs to retrieve or read its stored and previously calculated CRC signature for a given replica, and send its CRC signature to a checker module. The checker module can reside in any of the storage nodes, and the checker module can compare the received CRC signatures. If the received CRC signatures are the same, the system can successfully verify the integrity of the stored data. If the received CRC signatures are not the same, the system can determine that the stored data is not consistent, or unhealthy, and further evaluate the data (e.g., by performing a remedial action associated with the unhealthy data). The checker module can perform the signature comparison by performing an exclusive OR operation on the received CRC signatures.

For example, during a data integrity check, drive 512 can send CRC signature_1 540 to a checker module 524 of storage node 520 (via a storage network 502). Drive 522 can send a CRC signature_2 542 to checker module 524. Drive 532 can send CRC signature_3 544 to checker module 524 of storage node 520 (via storage network 502). Upon receiving all three of the CRC signatures, checker module 524 can perform a checker calculation 550, e.g., by performing an exclusive OR operation on the three received CRC signatures: ((CRC_S1) XOR (CRC_S2) XOR (CRC_S3)). If the XOR operation yields a true result (i.e., all the bits match), the system can successfully verify the data integrity. If the XOR operation does not yield a true result (i.e., yields a false result, and all the bits do not match), the system can perform a remedial action to address unhealthy data stored in the drives.

Thus, environment 500 depicts a reduced consumption of system resources because the system only needs to transfer the smaller CRC signatures (rather than all of the multiple replicas of the larger data itself) to the checker module, and also because the checker module itself only needs to perform a comparison operation on the smaller CRC signatures (rather than on all of the multiple replicas of the larger data itself). These operations can also result in an improved efficiency for the overall storage system.

Data Integrity Check in an EC-Based Distributed System

Figure 6:
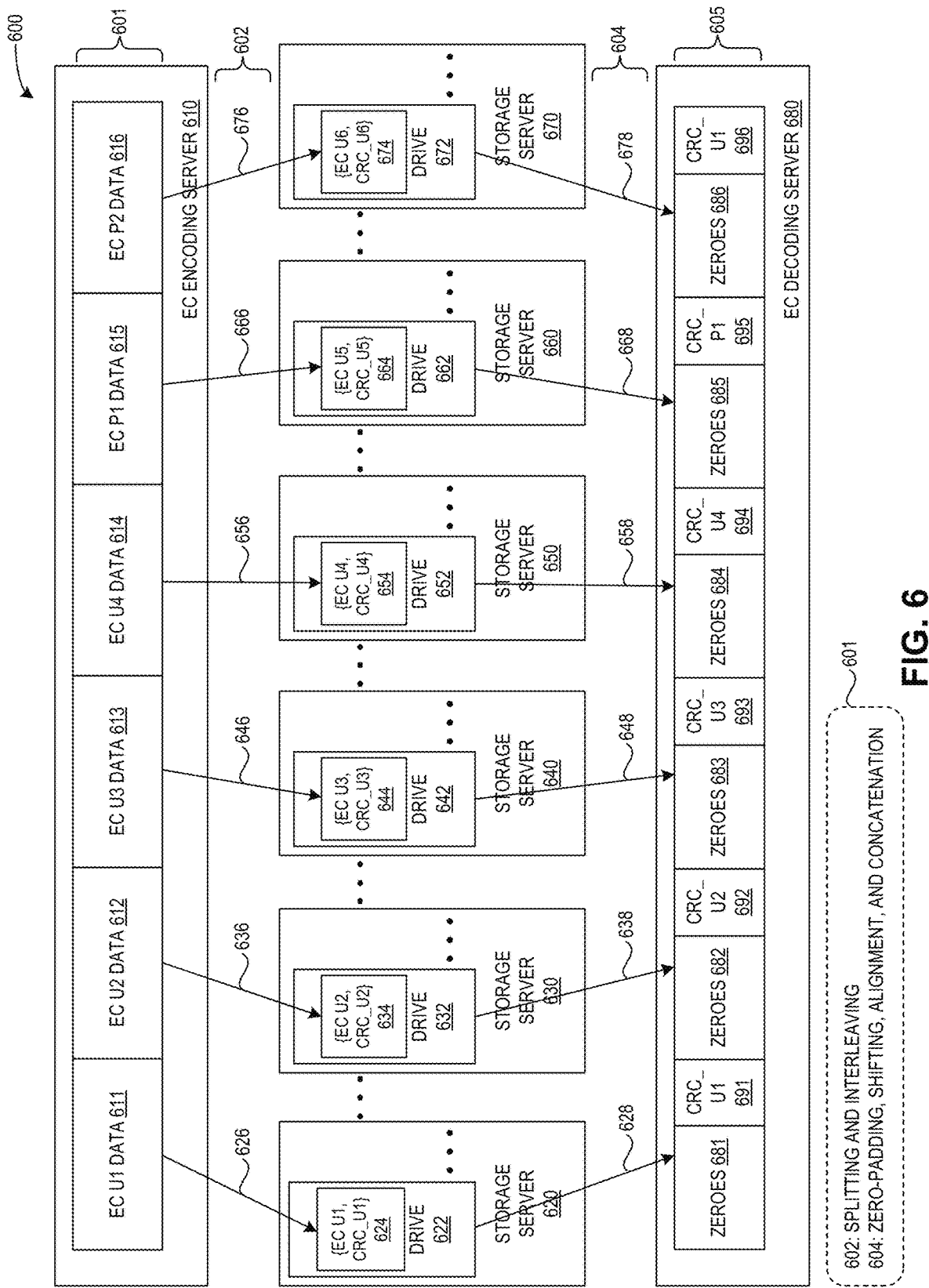
FIG. 6 illustrates an exemplary data integrity check in an EC-based distributed storage system, in accordance with an embodiment of the present application.

In some embodiments, the system can use erasure coding (EC) to protect the reliability and integrity of the data. FIG. 6 illustrates an exemplary data integrity check in an EC-based distributed storage system 600, in accordance with an embodiment of the present application. System 600 can receive data to be written to non-volatile memory. An EC encoding server 610 can encode the received data to create an initial EC codeword 601 that includes an EC parity. The system can divide EC codeword 601 into a plurality of parts, e.g., into 4 KB slices, denoted as: EC U1 data 611; EC U2 data 612; EC U3 data 613; EC U4 data 614; EC P1 data 615; and EC P2 data 616. The system can distribute the slices to be written to storage drives on multiple storage servers. When a respective storage server receives a slice, a controller of the respective storage server can calculate the CRC signature for the slice, and store the slice and the calculated CRC signature in the storage drive, in the manner described above in relation to FIGS. 2B and 3B.

For example, slice EC U1 data 611 can be transmitted (via a communication 626) to storage server 620. A controller of drive 622 of storage server 620 can calculate a CRC signature for slice EC U1 data 611 (e.g., CRC_U1), and write both the slice and the calculated CRC signature as "{EC U1, CRC_U1} 624 to drive 622. Each of the remaining slices of EC codeword 601 can be transmitted and written similarly to their respective drives (as shown via communications 636, 646, 656, 666, and 676, which results in writing data 634, 644, 654, 664, and 674 to drives 632, 642, 652, 662, and 672 of respective storage servers 630, 640, 650, 660, and 670).

EC-based distributed system 600 can periodically perform a data integrity check without transferring any portion of the data itself, which can result in a reduced consumption of system resources due to the bandwidth and CPU savings. As described above in relation to FIG. 3B, each drive can perform a single drive CRC check (using its local CRC signature) to verify the integrity of the data. Subsequently, each drive can send its local CRC signature to an EC decoding server 680, which can augment or pad each local CRC by pre-pending zeroes until the slice length is reached. EC decoding server 680 can shift and align the slices in the correct sequence (e.g., user data slices in order followed by parity slices in order), and can concatenate the shifted and aligned slices to form a parity check EC data 605. Parity check EC data 605 can be used as the input of EC decoding server 680. EC decoding server 680 can decode, based on the erasure code, parity check EC data 605 to determine whether the user data of the EC codeword is healthy. If the EC decoding is successful, the system can determine that the CRC signatures are correct and successfully verify that the stored data is healthy. If the EC decoding is not successful, the system can determine that the CRC signatures are not correct and can further evaluate the consistency of unhealthy data on a corresponding identified drive.

Exemplary Methods for Facilitating a Data Integrity Check

Figure 7A:
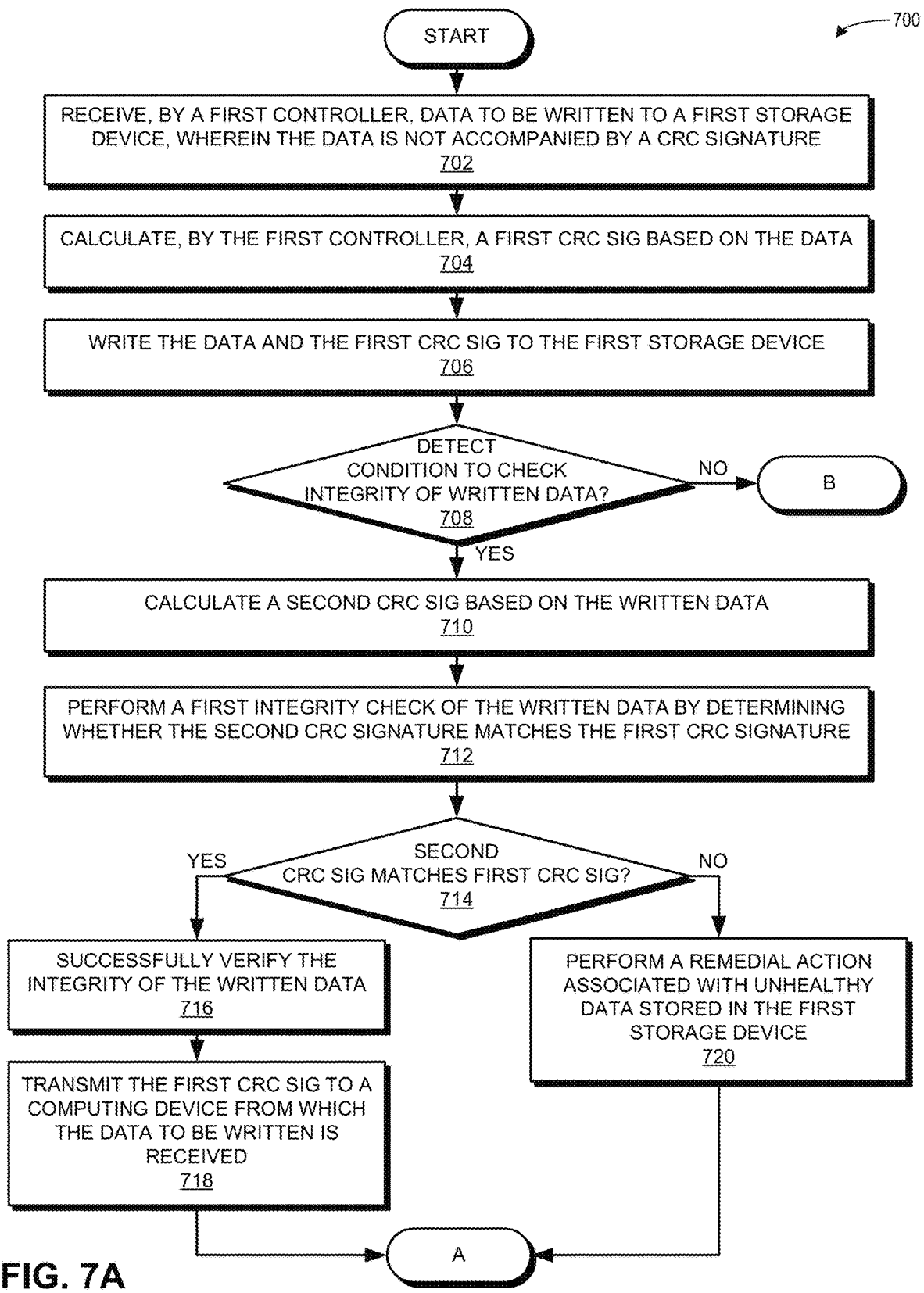
FIG. 7A presents a flowchart illustrating a method for facilitating a data integrity check, including a write operation and a first integrity check, in accordance with an embodiment of the present application.

The exemplary methods illustrated in FIGS. 7A, 7B, 7C, 8, and 9 depict calculating and performing a data integrity check based on various CRC signatures. As described above, the CRC signature is used only as an example. Other error-detecting codes or error detection codes may also be used. FIG. 7A presents a flowchart 700 illustrating a method for facilitating a data integrity check, including a write operation and a first integrity check, in accordance with an embodiment of the present application. During operation, the system receives, by a first controller, data to be written to a first storage device, wherein the data is not accompanied by a cyclic redundancy check (CRC) signature (operation 702). The system calculates, by the first controller, a first CRC signature based on the data (operation 704). The system writes the data and the first CRC signature to the first storage device (operation 706). If the system does not detect a condition to check the integrity of the written data (decision 708), the operation continues at Label B of FIG. 7C. If the system does detect a condition to check the integrity of the written data, the system calculates a second CRC signature based on the written data (operation 710). The system performs a first integrity check of the written data by determining whether the second CRC signature matches the first CRC signature (operation 712). If the second CRC signature matches the first CRC signature (decision 714), the system successfully verifies the integrity of the written data (operation 716), and transmits the first CRC signature to a computing device from which the data to be written is received (operation 718). If the second CRC signature does not match the first CRC signature (decision 714), the system performs a remedial action associated with unhealthy data stored in the first storage device (operation 720). The operation continues as described at Label A of FIG. 7B.

Figure 7B:
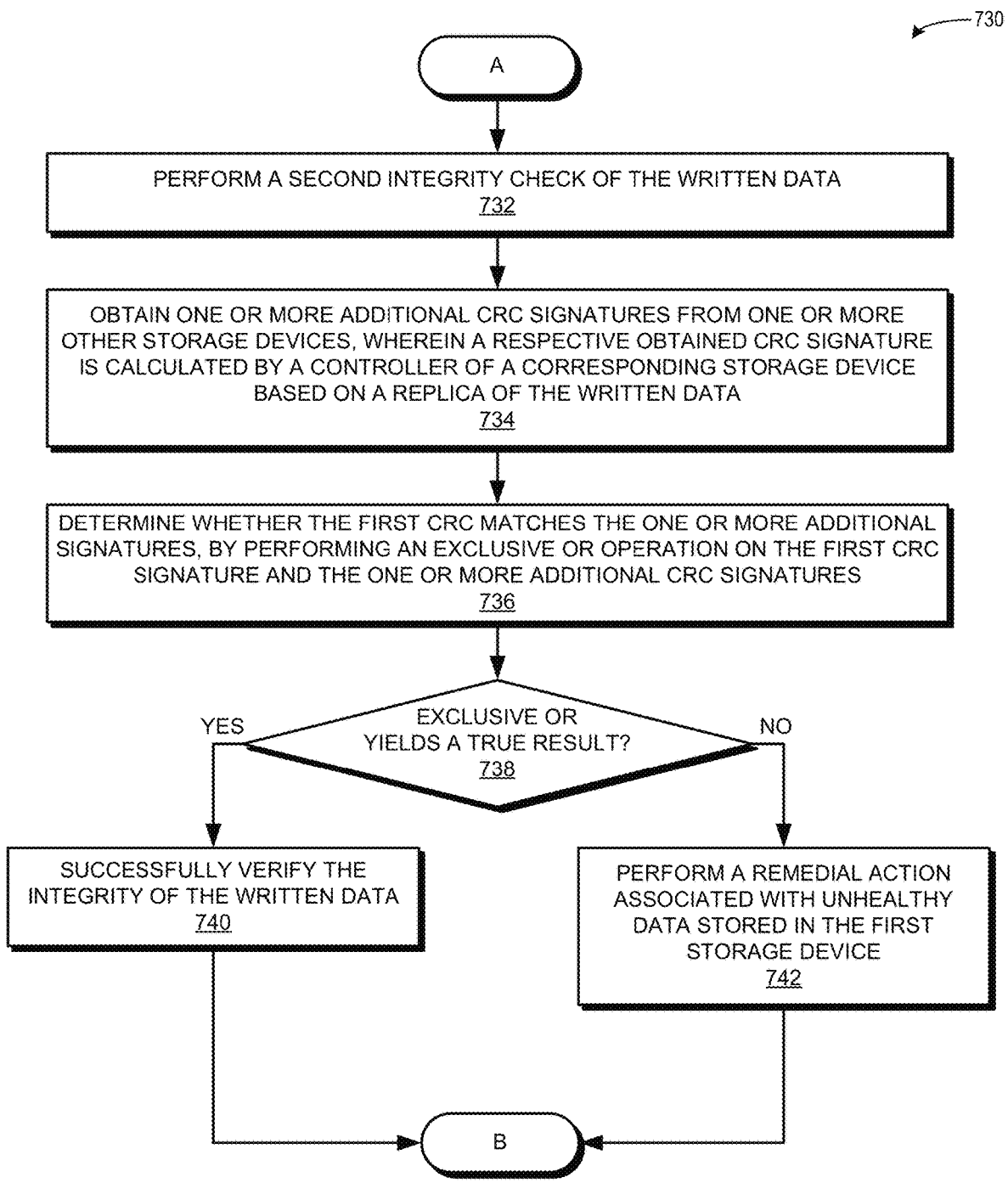
FIG. 7B presents a flowchart illustrating a method for facilitating a data integrity check, including a second integrity check, in accordance with an embodiment of the present application.

FIG. 7B presents a flowchart 730 illustrating a method for facilitating a data integrity check, including a second integrity check, in accordance with an embodiment of the present application. During operation, the system performs a second integrity check of the written data (operation 732). The system obtains one or more additional CRC signatures from one or more other storage devices, wherein a respective obtained CRC signature is calculated by a controller of a corresponding storage device based on a replica of the written data (operation 734). The system determines whether the first CRC signature matches the one or more additional CRC signatures, by performing an exclusive OR operation on the first CRC signature and the one or more additional CRC signatures (operation 736).

If the exclusive OR operation yields a true result (decision 738), the system successfully verifies the integrity of the written data (operation 740). If the exclusive OR operation does not yield a true result (i.e., yields a false result) (decision 738), the system performs a remedial action associated with unhealthy data stored in the first storage device (operation 742). The operation continues as described at Label B of FIG. 7C.

Figure 7C:
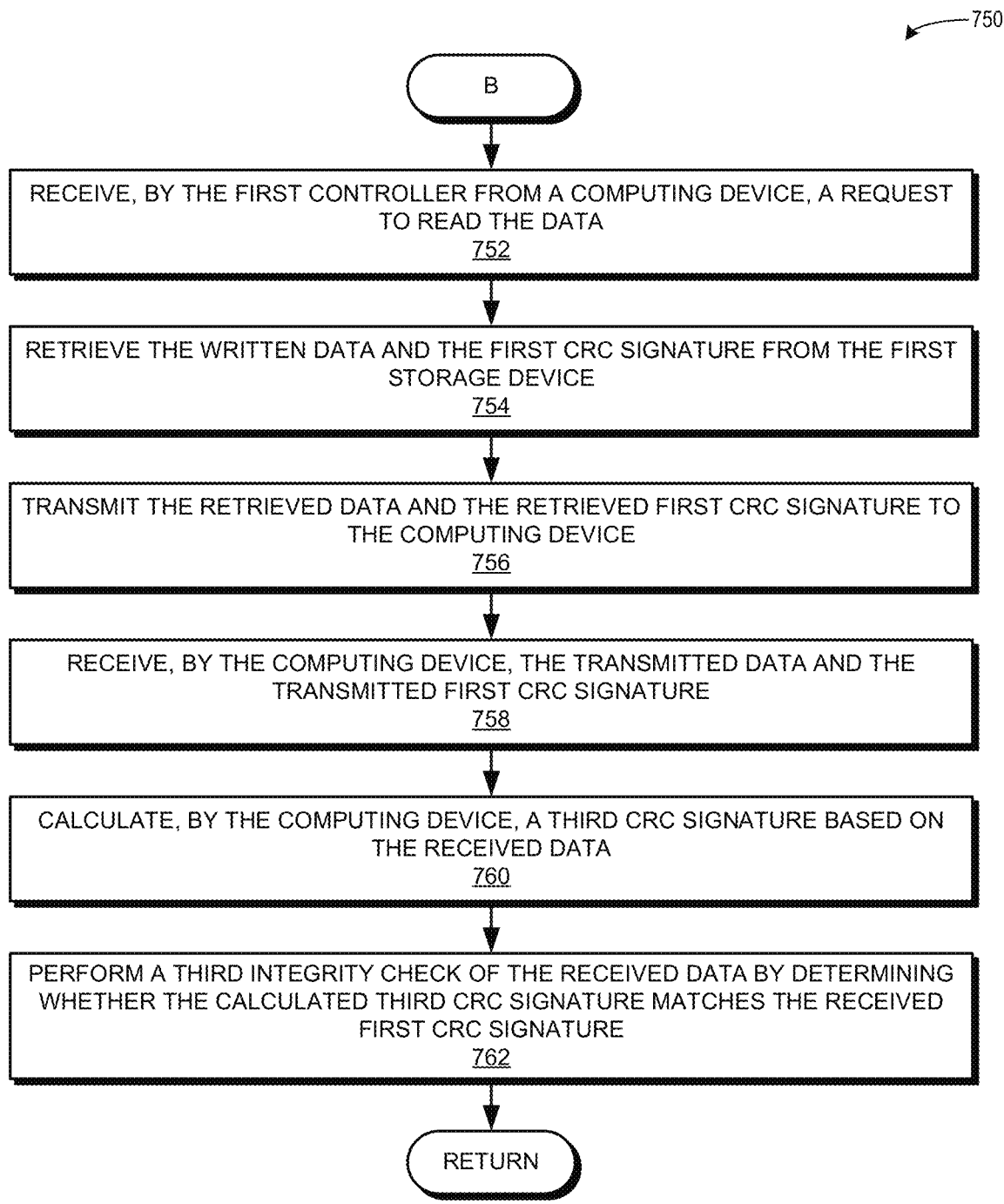
FIG. 7C presents a flowchart illustrating a method for facilitating a data integrity check, including a read operation, in accordance with an embodiment of the present application.

FIG. 7C presents a flowchart 750 illustrating a method for facilitating a data integrity check, including a read operation, in accordance with an embodiment of the present application. During operation, the system receives by the first controller from a computing device, a request to read the data (operation 752). The system retrieves the written data and the first CRC signature from the first storage device (operation 754). The system transmits the retrieved data and the retrieved first CRC signature to the computing device (operation 756). The system receives, by the computing device, the transmitted data and the transmitted first CRC signature (operation 758). The system calculates, by the computing device, a third CRC signature based on the received data (operation 760). The system performs a third integrity check of the received data by determining whether the calculated third CRC signature matches the received first CRC signature (operation 762). For example, in response to determining that the calculated third CRC signature matches the received first CRC signature, the system successfully verifies the integrity of the received data, and the operation returns.

Figure 8:
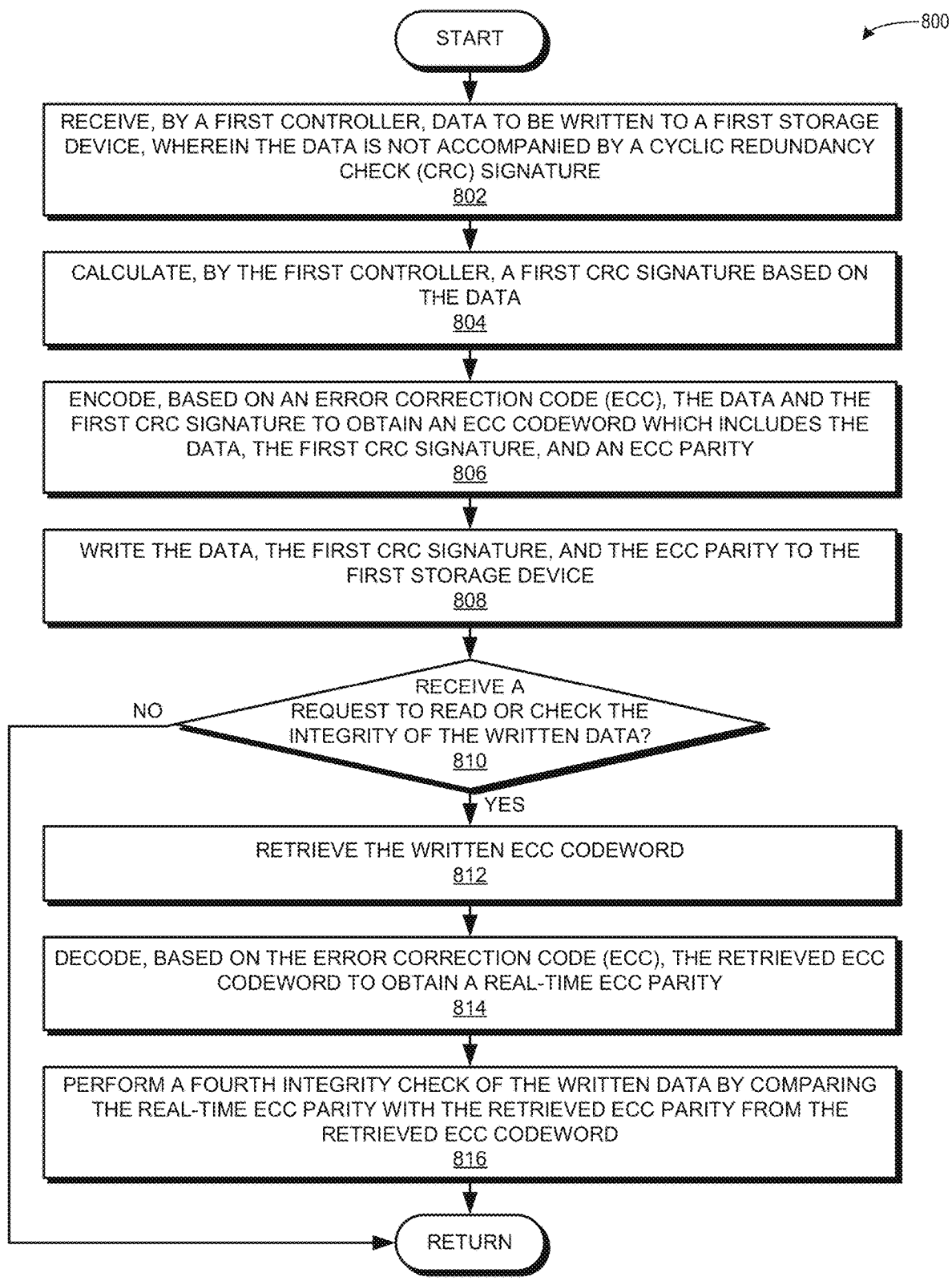
FIG. 8 presents a flowchart illustrating a method for facilitating a data integrity check, including an ECC encoding/decoding, in accordance with an embodiment of the present application.

FIG. 8 presents a flowchart 800 illustrating a method for facilitating a data integrity check, including an ECC encoding/decoding, in accordance with an embodiment of the present application. During operation, the system receives, by a first controller, data to be written to a first storage device, wherein the data is not accompanied by a cyclic redundancy check (CRC) signature (operation 802). The system calculates, by the first controller, a first CRC signature based on the data (operation 804). The system encodes, based on an error correction code (ECC), the data and the first CRC signature to obtain an ECC codeword which includes the data, the first CRC signature, and an ECC parity (operation 806). The system writes the data, the first CRC signature, and the ECC parity to the first storage device (operation 808). If the system does not receive a request to read or check the integrity of the written data (decision 810), the operation returns. If the system does receive a request to read or check the integrity of the written data (decision 810), the system retrieves the written ECC codeword (operation 812). The system decodes, based on the error correction code (ECC), the retrieved ECC codeword to obtain a real-time ECC parity (operation 814). The system performs a fourth integrity check of the data from the retrieved ECC codeword by comparing the real-time ECC parity with the retrieved ECC parity from the retrieved ECC codeword (operation 816), and the operation returns.

Figure 9:
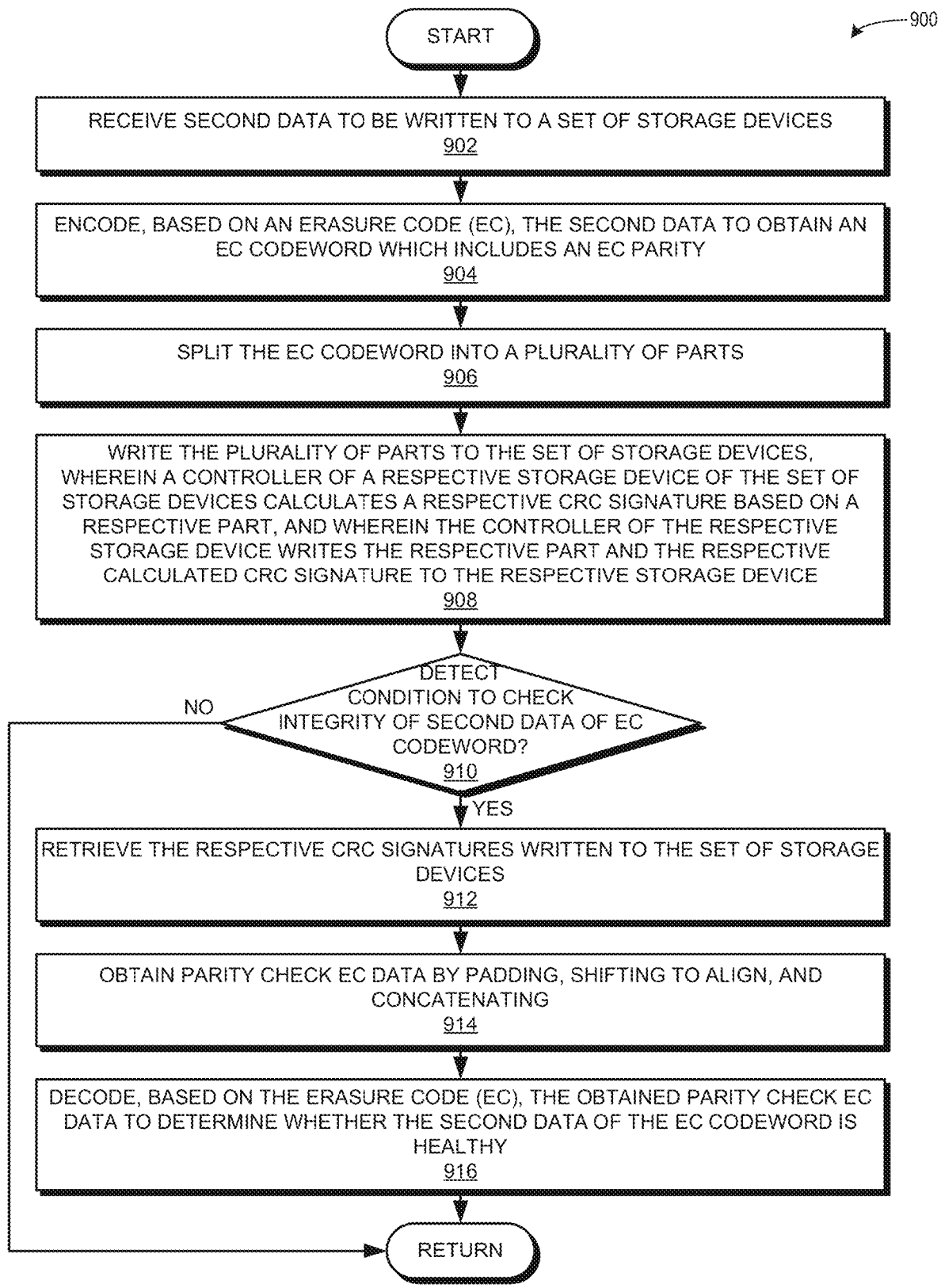
FIG. 9 presents a flowchart illustrating a method for facilitating a data integrity check in an EC-based distributed system, in accordance with an embodiment of the present application.

FIG. 9 presents a flowchart 900 illustrating a method for facilitating a data integrity check in an EC-based distributed system, in accordance with an embodiment of the present application. During operation, the system receives second data to be written to a set of storage devices (operation 902). The system encodes, based on an erasure code (EC), the second data to obtain an EC codeword which includes an EC parity (operation 904). The system splits the EC codeword into a plurality of parts (operation 906). The system writes the plurality of parts to the set of storage devices, wherein a controller of a respective storage device of the set of storage devices calculates a respective CRC signature based on a respective part, and wherein the controller of the respective storage device writes the respective part and the respective calculated CRC signature to the respective storage device (operation 908).

If the system does not detect a condition to check the integrity of the second data of the EC codeword (decision 910), the operation returns. If the system does detect a condition to check the integrity of the second data of the EC codeword (decision 910), the system retrieves the respective CRC signatures written to the set of storage devices (operation 912). The system obtains parity check EC data by padding with zeroes, shifting to align, and concatenating (operation 914), as described above in relation to FIG. 6. The system decodes, based on the erasure code (EC), the obtained parity check EC data to determine whether the second data of the EC codeword is healthy, and the operation returns.

Exemplary Computer System

Figure 10:
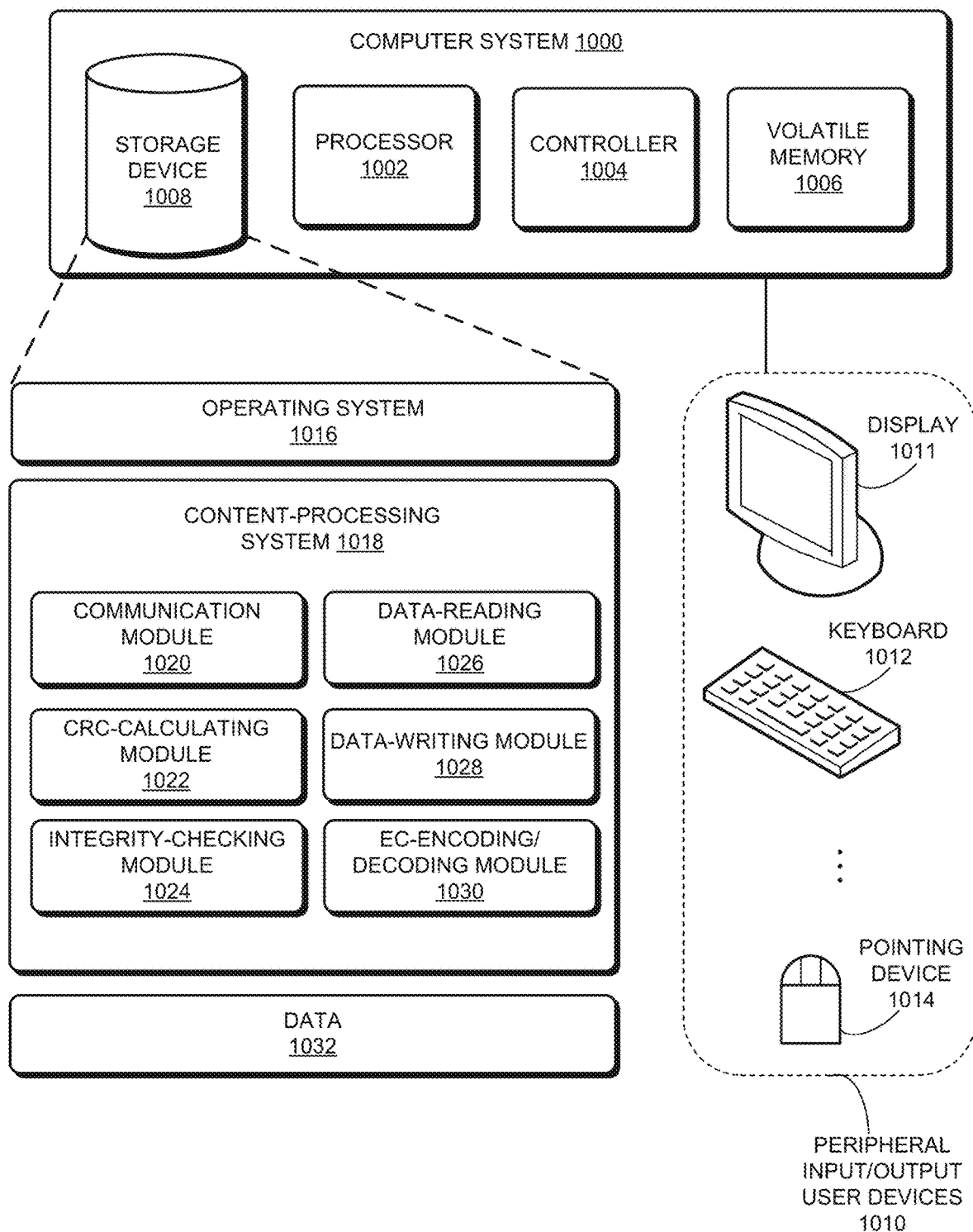
FIG. 10 illustrates an exemplary computer system that facilitates a data integrity check, in accordance with an embodiment of the present application.

FIG. 10 illustrates an exemplary computer system 1000 that facilitates a data integrity check, in accordance with an embodiment of the present application. Computer system 1000 includes a processor 1002, a controller 1004, a volatile memory 1006, and a storage device 1008. Volatile memory 806 can include, e.g., random access memory (RAM), that serves as a managed memory, and can be used to store one or more memory pools. Storage device 1008 can include persistent storage which can be managed or accessed via processor 1002 or controller 1004. Furthermore, computer system 800 can be coupled to peripheral input/output (I/O) user devices 1010, e.g., a display device 1011, a keyboard 1012, and a pointing device 1014. Storage device 1008 can store an operating system 1016, a content-processing system 1018, and data 1032.

Content-processing system 1018 can include instructions, which when executed by computer system 1000, can cause computer system 1000 to perform methods and/or processes described in this disclosure. Specifically, content-processing system 1018 can include instructions for receiving and transmitting data packets, including data to be read or written, an input/output (I/O) request (e.g., a read request or a write request), and a checksum or CRC signature (communication module 1020).

Content-processing system 1018 can further include instructions for receiving, by a first controller, data to be written to a first storage device, wherein the data is not accompanied by a cyclic redundancy check (CRC) signature (communication module 1020). Content-processing system 1018 can include instructions for Calculating, by the first controller, a first CRC signature based on the data (CRC-calculating module 1022). Content-processing system 1018 can include instructions for writing the data and the first CRC signature to the first storage device (data-writing module 1028). Content-processing system 1018 can include instructions for calculating a first real-time CRC signature based on the written data (CRC-calculating module 1022). Content-processing system 1018 can include instructions for performing a first integrity check of the written data by determining whether the first real-time CRC signature matches the first CRC signature (integrity-checking module 1024). Content-processing system 1018 can also include instructions for performing a second integrity check of the written data by: obtaining one or more additional CRC signatures from one or more other storage devices, wherein a respective obtained CRC signature is calculated by a controller of a corresponding storage device based on a replica of the written data; and determining whether the first CRC signature matches the one or more additional CRC signatures (integrity-checking module 1024).

Content-processing system 1018 can additionally include instructions for receiving, by the first controller from a computing device, a request to read the data (communication module 1020). Content-processing system 1018 can include instructions for retrieving the written data and the first CRC signature from the first storage device (data-reading module 1026). Content-processing system 1018 can include instructions for transmitting the retrieved data and the retrieved first CRC signature to the computing device (communication module 1020).

Content-processing system 1018 can also include instructions for receiving second data to be written to a set of storage devices (communication module 1020). Content-processing system 1018 can include instructions for encoding, based on an erasure code (EC), the second data to obtain an EC codeword which includes an EC parity (EC-encoding/ decoding module 1030). Content-processing system 1018 can include instructions for splitting the EC codeword into a plurality of parts (EC-encoding/decoding module 1030). Content-processing system 1018 can include instructions for writing the plurality of parts to the set of storage devices, wherein a controller of a respective storage device of the set of storage devices calculates a respective CRC signature based on a respective part, and wherein the controller of the respective storage device writes the respective part and the respective calculated CRC signature to the respective storage device (data-writing module 1028).

Content-processing system 1018 can further include instructions for detecting a condition to check an integrity of the EC codeword written as the plurality of parts to the set of storage devices (integrity-checking module 1024). Content-processing system 1018 can include instructions for retrieving the respective CRC signatures written to the set of storage devices (data-reading module 1026). Content-processing system 1018 can include instructions for obtaining parity check EC data by padding, shifting to align, and concatenating (data-reading module 1026 and EC-encoding/decoding module 1030). Content-processing system 1018 can include instructions for decoding, based on the erasure code (EC), the obtained parity check EC data to determine whether the second data of the EC codeword is healthy (EC-encoding/decoding module 1030).

Data 1032 can include any data that is required as input or generated as output by the methods and/or processes described in this disclosure. Specifically, data 1032 can store at least: data; a request; a read request; a write request; an input/output (I/O) request; data associated with a read request, a write request, or an I/O request; a checksum; a CRC signature; ECC-encoded or decoded data; an ECC codeword; ECC parity bits; EC-encoded or decoded data; an EC codeword; EC parity bits; a real-time CRC signature; an exclusive OR operation; an indicator of a result of an integrity check; a true result; a false result; an indicator of a remedial action; unhealthy data; healthy data; a number of parts or slices of data; an indicator or identifier of a storage drive, storage node, or a storage server; padded data; aligned data; shifted data; and concatenated data.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method, comprising:
receiving, by a first controller, data to be written to a first storage device;
calculating, by the first controller, a first error detection code based on the data;
writing the data and the first error detection code to the first storage device;
calculating a second error detection code based on the written data;
performing a first integrity check of the written data by determining whether the second error detection code matches the first error detection code; and
performing a second integrity check of the written data by obtaining one or more additional error detection codes from one or more other storage devices,
wherein a respective obtained error detection code is calculated by a controller of a corresponding storage device based on a replica of the written data.

2. The method of claim 1, wherein performing the first integrity check of the written data comprises:
in response to determining that the second error detection code matches the first error detection code:
successfully verifying the integrity of the written data; and
transmitting the first error detection code to a computing device from which the data to be written is received; and
in response to determining that the second error detection code does not match the first error detection code, performing a remedial action associated with unhealthy data stored in the first storage device.

3. The method of claim 1,
wherein performing the second integrity check of the written data further comprises:
determining whether the first error detection code matches the one or more additional error detection codes.

4. The method of claim 3, wherein performing the second integrity check of the written data further comprises:
performing an exclusive OR operation on the first error detection code and the one or more additional error detection codes;
in response to determining that the exclusive OR operation yields a true result, successfully verifying the integrity of the written data; and
in response to determining that the exclusive OR operation yields a false result, performing a remedial action associated with unhealthy data stored in the first storage device or the other storage devices.

5. The method of claim 1, further comprising:
receiving, by the first controller from a computing device, a request to read the data;
retrieving the written data and the first error detection code from the first storage device; and transmitting the retrieved data and the retrieved first error detection code to the computing device, which causes the computing device to:
  receive the transmitted data and the transmitted first error detection code;
  calculate a third error detection code based on the received data;
  perform a third integrity check of the received data by determining whether the calculated third error detection code matches the received first error detection code; and
  in response to determining that the calculated third error detection code matches the received first error detection code, successfully verify the integrity of the received data.

6. The method of claim 1, wherein prior to writing the data and the first error detection code to the first storage device, the method further comprises:
  encoding, based on an error correction code (ECC), the data and the first error detection code to obtain an ECC codeword which includes the data, the first error detection code, and an ECC parity,
  wherein writing the data and the first error detection code to the first storage device comprises writing the ECC codeword to the first storage device.

7. The method of claim 6, further comprising:
  receiving, by the first controller, a request to read the data;
  retrieving the written ECC codeword from the first storage device;
  decoding, based on the error correction code (ECC), the retrieved ECC codeword to obtain a real-time ECC parity; and
  performing a fourth integrity check of the data from the retrieved ECC codeword by comparing the real-time ECC parity with the retrieved ECC parity from the retrieved ECC codeword.

8. The method of claim 1, further comprising:
  receiving second data to be written to a set of storage devices;
  encoding, based on an erasure code (EC), the second data to obtain an EC codeword which includes an EC parity;
  splitting the EC codeword into a plurality of parts; and
  writing the plurality of parts to the set of storage devices,
  wherein a controller of a respective storage device of the set of storage devices calculates a respective error detection code based on a respective part, and
  wherein the controller of the respective storage device writes the respective part and the respective calculated error detection code to the respective storage device.

9. The method of claim 8, further comprising:
  detecting a condition to check an integrity of the EC codeword written as the plurality of parts to the set of storage devices;
  retrieving the respective error detection codes written to the set of storage devices;
  obtaining parity check EC data by:
    padding the retrieved respective error detection codes with zeros;
    shifting the respective error detection codes to align with the EC codeword; and
    concatenating the shifted respective error detection codes to form the parity check EC data; and
  decoding, based on the erasure code (EC), the obtained parity check EC data to determine whether the second data of the EC codeword is healthy.

10. A computer system, comprising:
  a processor; and
  a memory coupled to the processor and storing instructions, which when executed by the processor cause the processor to perform a method, the method comprising:
    receiving, by a first controller, data to be written to a first storage device;
    calculating, by the first controller, a first error detection code based on the data;
    writing the data and the first error detection code to the first storage device;
    calculating a second error detection code based on the written data;
    performing a first integrity check of the written data by determining whether the second error detection code matches the first error detection code; and
    performing a second integrity check of the written data by obtaining one or more additional error detection codes from one or more other storage devices,
    wherein a respective obtained error detection code is calculated by a controller of a corresponding storage device based on a replica of the written data.

11. The computer system of claim 10, wherein performing the first integrity check of the written data comprises:
  in response to determining that the second error detection code matches the first error detection code:
    successfully verifying the integrity of the written data; and
    transmitting the first error detection code to a computing device from which the data to be written is received; and
  in response to determining that the second error detection code does not match the first error detection code, performing a remedial action associated with unhealthy data stored in the first storage device.

12. The computer system of claim 10,
  wherein performing the second integrity check of the written data further comprises:
    determining whether the first error detection code matches the one or more additional error detection codes.

13. The computer system of claim 12, wherein performing the second integrity check of the written data further comprises:
  performing an exclusive OR operation on the first error detection code and the one or more additional error detection codes;
  in response to determining that the exclusive OR operation yields a true result, successfully verifying the integrity of the written data; and
  in response to determining that the exclusive OR operation yields a false result, performing a remedial action associated with unhealthy data stored in the first storage device or the other storage devices.

14. The computer system of claim 10, wherein the method further comprises:
  receiving, by the first controller from a computing device, a request to read the data;
  retrieving the written data and the first error detection code from the first storage device; and
  transmitting the retrieved data and the retrieved first error detection code to the computing device, which causes the computing device to:
    receive the transmitted data and the transmitted first error detection code;
    calculate a third error detection code based on the received data;

perform a third integrity check of the received data by determining whether the calculated third error detection code matches the received first error detection code; and in response to determining that the calculated third error detection code matches the received first error detection code, successfully verify the integrity of the received data.

15. The computer system of claim 10, wherein prior to writing the data and the first error detection code to the first storage device, the method further comprises:

encoding, based on an error correction code (ECC), the data and the first error detection code to obtain an ECC codeword which includes the data, the first error detection code, and an ECC parity, wherein writing the data and the first error detection code to the first storage device comprises writing the ECC codeword to the first storage device.

16. The computer system of claim 15, wherein the method further comprises:

receiving, by the first controller, a request to read the data;
retrieving the written ECC codeword from the first storage device;
decoding, based on the error correction code (ECC), the retrieved ECC codeword to obtain a real-time ECC parity; and
performing a fourth integrity check of the data from the retrieved ECC codeword by comparing the real-time ECC parity with the retrieved ECC parity from the retrieved ECC codeword.

17. The computer system of claim 10, wherein the method further comprises:

receiving second data to be written to a set of storage devices;
encoding, based on an erasure code (EC), the second data to obtain an EC codeword which includes an EC parity;
splitting the EC codeword into a plurality of parts; and
writing the plurality of parts to the set of storage devices,
wherein a controller of a respective storage device of the set of storage devices calculates a respective error detection code based on a respective part, and
wherein the controller of the respective storage device writes the respective part and the respective calculated error detection code to the respective storage device.

18. The computer system of claim 17, wherein the method further comprises:

detecting a condition to check an integrity of the EC codeword written as the plurality of parts to the set of storage devices;
retrieving the respective error detection codes written to the set of storage devices;
obtaining parity check EC data by:
padding the retrieved respective error detection codes with zeros;
shifting the respective error detection codes to align with the EC codeword; and
concatenating the shifted respective error detection codes to form the parity check EC data; and
decoding, based on the erasure code (EC), the obtained parity check EC data to determine whether the second data of the EC codeword is healthy.

19. A non-transitory computer-readable storage medium storing instructions that when executed by a computer cause the computer to perform a method, the method comprising:

receiving, by a first controller, data to be written to a first storage device, wherein the data is not accompanied by a cyclic redundancy check (CRC) signature;
calculating, by the first controller, a first error detection code based on the data;
writing the data and the first error detection code to the first storage device;
calculating a second error detection code based on the written data;
performing a first integrity check of the written data by determining whether the second error detection code matches the first error detection code; and
performing a second integrity check of the written data by:
obtaining one or more additional error detection codes from one or more other storage devices, wherein a respective obtained error detection code is calculated by a controller of a corresponding storage device based on a replica of the written data; and
determining whether the first error detection code matches the one or more additional error detection codes.

20. The storage medium of claim 19, wherein the method further comprises:

receiving, by the first controller from a computing device, a request to read the data;
retrieving the written data and the first error detection code from the first storage device; and
transmitting the retrieved data and the retrieved first error detection code to the computing device, which causes the computing device to:
receive the transmitted data and the transmitted first error detection code;
calculate a third error detection code based on the received data;
perform a third integrity check of the received data by determining whether the calculated third error detection code matches the received first error detection code; and
in response to determining that the calculated third error detection code matches the received first error detection code, successfully verify the integrity of the received data.

* * * * *